US008224151B2

(12) United States Patent  
Inoue et al.

(10) Patent No.: US 8,224,151 B2  
(45) Date of Patent: *Jul. 17, 2012

(54) APPARATUS FOR RECORDING AND REPRODUCING DIGITAL IMAGE AND SPEECH

(75) Inventors: Hisashi Inoue, Kashiwa (JP); Keiji Nagayama, Hitachinaka (JP); Tomishige Yatsugi, Hitachinaka (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1639 days.

This patent is subject to a terminal disclaimer.

(21) Appl. No.: 11/516,609

(22) Filed: Sep. 7, 2006

(65) Prior Publication Data

US 2007/0003234 A1     Jan. 4, 2007

Related U.S. Application Data

(63) Continuation of application No. 09/793,528, filed on Feb. 27, 2001, now Pat. No. 7,106,954, which is a continuation of application No. 08/838,286, filed on Apr. 17, 1997, now Pat. No. 6,226,449.

(30) Foreign Application Priority Data

Apr. 17, 1996   (JP) ...................................... 8-095498  
Feb. 17, 1997   (JP) ...................................... 9-032200

(51) Int. Cl.  
    *H04N 5/225*     (2006.01)  
(52) U.S. Cl. ..................... 386/243; 386/248; 348/231.4; 348/231.5  
(58) Field of Classification Search .......................... None  
See application file for complete search history.

(56) References Cited

U.S. PATENT DOCUMENTS 4,658,304 A      4/1987    Tsunekawa  
(Continued)

FOREIGN PATENT DOCUMENTS

EP           0642274        3/1995  
(Continued)

OTHER PUBLICATIONS

Content Oriented Visual Interface Using Video Icons for Visual Database Systems, Tonomura et al, 1990 Academic Press Limited, NTT Human Interface Laboratories, Nippon Telegraph and Telephone Corporation, Jan. 15, 1990, Journal of Visual Languages and Computing 1990 1, pp. 183-198.

(Continued)

*Primary Examiner* — Thai Tran  
*Assistant Examiner* — Sunghyoun Park  
(74) *Attorney, Agent, or Firm* — Jefferson IP Law, LLP

(57) ABSTRACT

An imaging apparatus and method includes an input device to which image data is inputted, a recorder which records the inputted image data into a recording medium, an eraser which erases the recorded image data in the recording medium, a protector which protects from an erasure setting so as to protect from erasure by the eraser of the recorded image data, and a display which displays a list of reduced images of a plurality of image data recorded in the recording medium. While the recorder is controlled utilizing a filing system and the list of reduced images of the plurality of image data recorded in the recording medium is displayed, the display is controlled so as to display a mark indicating that protection from erasure is set with respect to the recorded image data for which protection from erasure is set by the protector.

28 Claims, 13 Drawing Sheets

U.S. PATENT DOCUMENTS

| | | |
|---|---|---|
| 4,939,594 A | 7/1990 | Moxon |
| 4,982,291 A | 1/1991 | Kurahashi |
| 5,001,568 A | 3/1991 | Efron |
| 5,130,813 A | 7/1992 | Oie |
| 5,130,860 A | 7/1992 | Nagashima |
| 5,182,553 A * | 1/1993 | Kung .............................. 340/7.1 |
| 5,361,173 A | 11/1994 | Ishii |
| 5,459,582 A | 10/1995 | Takashi |
| 5,488,433 A * | 1/1996 | Washino et al. .............. 348/722 |
| 5,613,032 A | 3/1997 | Cruz |
| 5,648,816 A * | 7/1997 | Wakui ........................ 348/231.9 |
| 5,650,991 A * | 7/1997 | Fujiie ........................ 369/53.22 |
| 5,706,097 A | 1/1998 | Schelling |
| 5,739,865 A | 4/1998 | Takahashi |
| 5,760,767 A | 6/1998 | Shore |
| 5,786,851 A | 7/1998 | Kondo |
| 5,815,201 A | 9/1998 | Hashimoto |
| 5,850,500 A | 12/1998 | Hirayama |
| 5,872,521 A * | 2/1999 | Lopatukin et al. ........... 340/7.52 |
| 5,911,032 A | 6/1999 | Hirayama |
| 5,974,386 A * | 10/1999 | Ejima et al. ................... 704/276 |
| 6,091,883 A * | 7/2000 | Artigalas et al. ............. 386/328 |
| 6,342,900 B1 * | 1/2002 | Ejima et al. ................... 345/698 |
| 6,407,772 B2 | 6/2002 | Mitoguchi |
| 6,526,219 B1 | 2/2003 | Posa |
| 6,549,232 B1 | 4/2003 | Taniguchi |
| 2001/0009607 A1 * | 7/2001 | Ejima et al. .................... 386/96 |

FOREIGN PATENT DOCUMENTS

| | | |
|---|---|---|
| EP | 0678816 | 10/1995 |
| JP | 7284058 | 10/1954 |
| JP | 62-205447 A | 9/1987 |
| JP | 02-125586 | 5/1990 |
| JP | 03-286444 | 12/1991 |
| JP | 3272289 | 12/1991 |
| JP | 06-060620 A | 3/1994 |
| JP | 686214 | 3/1994 |
| JP | 06-314176 | 11/1994 |
| JP | 07-168855 A | 7/1995 |
| JP | 07-184160 | 7/1995 |
| JP | 7264530 | 10/1995 |
| JP | 07-319660 A | 12/1995 |
| JP | 08-032922 | 2/1996 |

OTHER PUBLICATIONS

Liquid Crystal Digital Camera QV-10, Casio Computer, Ltd. (release Mar. 1995).

* cited by examiner

FIG. 11

| | | | |
|---|---|---|---|
| 🎬 | 97/10/21 | AM11:41 | 1 |
| 🎵 | 97/ 7/ 5 | PM 3:20 | 1 🔑 |
| 🗒 | 97/ 5/ 1 | AM10:35 | 1 |
| 🗒 | 97/ 3/12 | PM 1:15 | 1 🔑 |
| 🎬 | 97/ 2/ 5 | PM 3:20 | 1 |
| 🎬 | 97/ 1/ 1 | AM 9:18 | 1 🔑 |

SELECTED BY ▼▲  ▶ CHANGE  ◀ RETURN

FIG. 12

| | | | |
|---|---|---|---|
| 🎬 | 97/10/21 | AM11:41 | 1 |
| 🎵 | 97/ 7/ 5 | PM 3:20 | 1 🔑 |
| 🗒 | 97/ 5/ 1 | AM10:35 | 1 |
| 🗒 | 97/ 3/12 | PM 1:15 | 1 🔑 |
| 🎬 | 97/ 2/ 5 | PM 3:20 | 1 |
| 🎬 | 97/ 1/ 1 | AM 9:18 | 1 🔑 |

SELECTED BY ▼▲  ▶ DETERMINE DESTINATION  ◀ RETURN

| RECORDING MODE | MODE SYMBOL |
|---|---|
| MOVING IMAGE |  |
| STILL IMAGE |  |
| SERIAL STILL IMAGE |  |
| STILL IMAGE WITH SPEECH |  |

APPARATUS FOR RECORDING AND REPRODUCING DIGITAL IMAGE AND SPEECH

CROSS REFERENCE TO RELATED APPLICATION

This application is a continuation of U.S. application Ser. No. 09/793,528, filed Feb. 27, 2001 now U.S. Pat. No. 7,106,954, which is a continuation of U.S. application Ser. No. 08/838,286, filed Apr. 17, 1997, now U.S. Pat. No. 6,226,449.

BACKGROUND OF THE INVENTION

The present invention relates to operativity of a portable digital camcorder.

The prior art relevant to the portable digital camcorder has been published as an electronic photograph system, that is, the so-called electronic still camera that is arranged to record a still image signal as a video signal in a memory composed of a semiconductor (termed as a semiconductor memory or simply a memory) as disclosed in JP-A-2-292974. With recent prevail of personal computers, recording mediums such as semiconductor memories and hard disks are progressively made lower in cost, smaller in size, and greater in capacity. At a time, the advance of signal compressing technology such as JPEG or MPEG allows even the small-sized equipment to record greater number of still images and moving ones. Taking a hard disk drive as an example, the resulting hard disk drive is kept as small as a card and has as great a capacity as about 300 Mbytes.

This type of hard disk drive enables to record about 3000 still images through the use of the JPEG compression and about 20-minutes moving picture through the use of the MPEG compression. It is thus necessary to improve the operativity of the portable equipment for retrieving, grouping, and deleting a great deal of recording data. The technique disclosed in JP-A-2-292974, however, does not provide means for retrieving a great deal of recording data quickly and easily. In actual, therefore, the technique does not have any means except the method of retrieving the great deal of recorded data as checking all images reproduced on screen from the recorded data.

In case that 3000 JPEG still images are recorded on a feasible media such as the aforementioned hard disk drive and then are retrieved as expanding those images on the screen one by one, about one second for expanding one JPEG still image is required. It means that the expansion of 3000 images needs about one hour. This method lacks in practicability. In order to retrieve a great deal of data, therefore, it is necessary to enhance the operating speed of the system.

SUMMARY OF THE INVENTION

It is an object of the present invention to provide an apparatus which is arranged to overcome the foregoing shortcoming and enhance the operativity even if the apparatus is small-sized.

In carrying out the object, for improving the operativity of a small-sized apparatus, the present invention is achieved by an apparatus which comprises recording means for recording both imaging time information and imaging mode information for distinguishing moving images from still images at a time when taking the still image or moving image, display means for displaying as a list the informations as well as expanded images on a liquid crystal display screen built in the main body of the apparatus itself, and keying means for retrieving, classifying, and erasing the recorded data.

BRIEF DESCRIPTION OF THE DRAWINGS

FIG. 11 is a view showing a display screen on which the classifications of the recorded data are changed;

FIG. 12 is a view showing a display screen on which the displaying sequence of the recorded data is changed;

DESCRIPTION OF THE PREFERRED EMBODIMENTS

Later, the description will be oriented to the embodiments of the present invention with reference to FIGS. 1 to 19.

Figure 1:
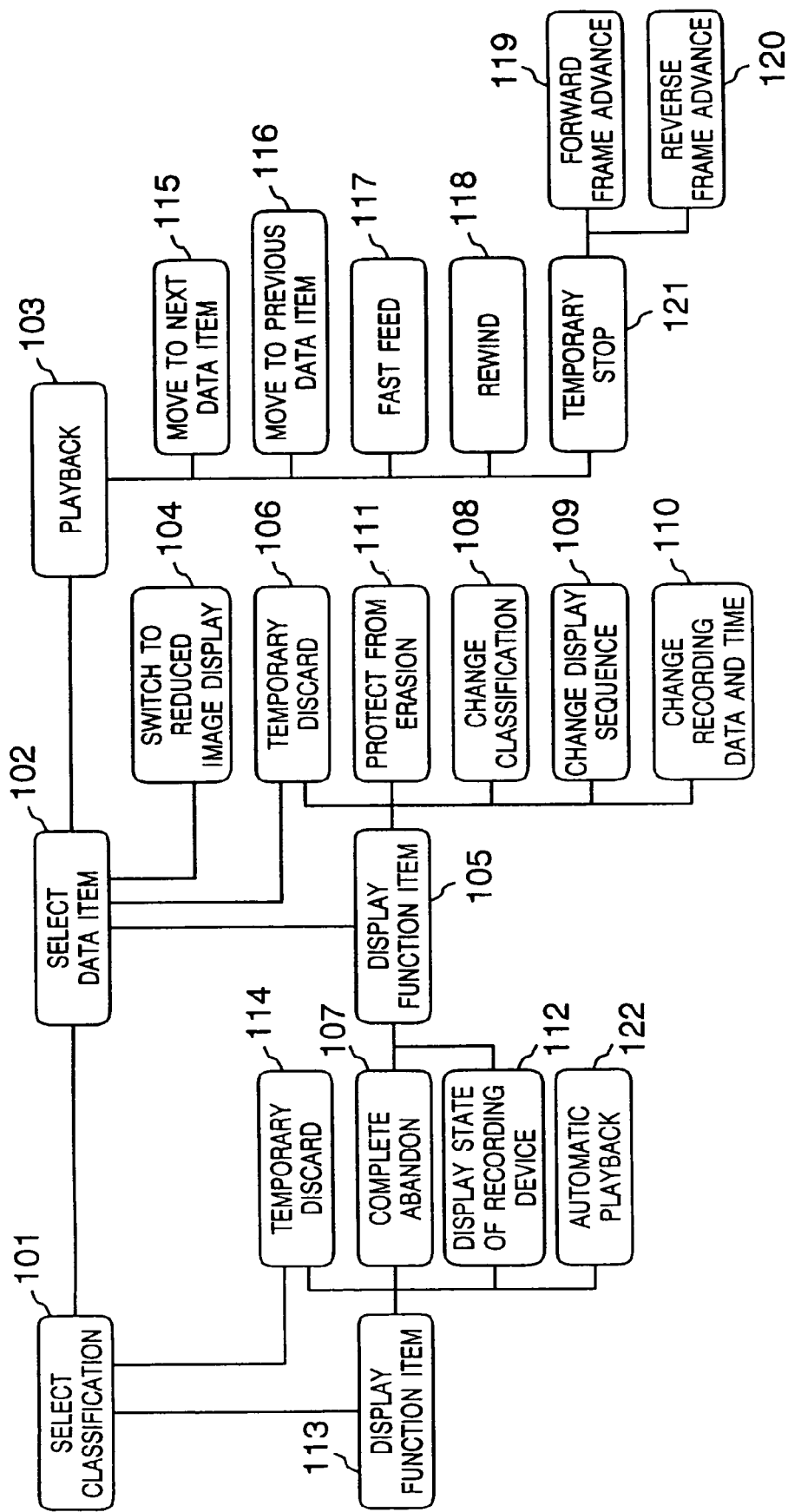
FIG. 1 is a diagram showing a state transition of a program used in an apparatus according to the present invention.

FIG. 1 shows a flow of a software program according to an embodiment of the present invention.

Figure 2:
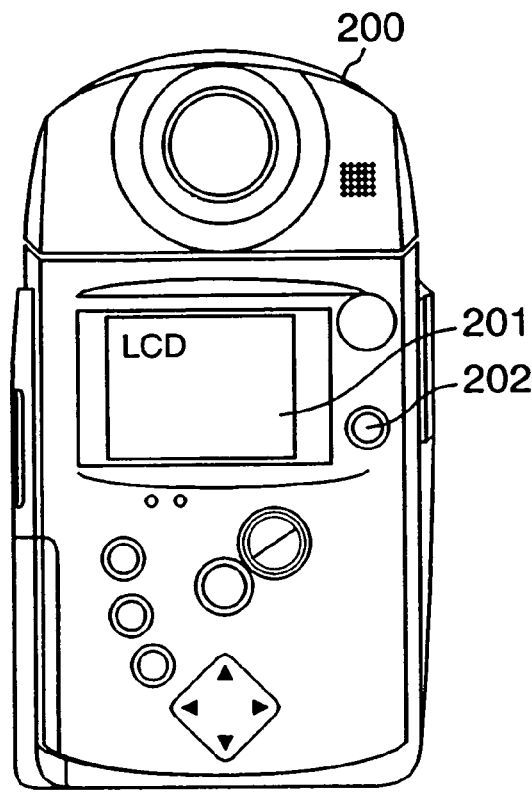
FIG. 2 is a view showing an outer appearance of a portable digital camcorder in which the program of FIG. 1 is executed.

The software program shown in FIG. 1 flows through the process of selecting a classification containing data to be played back or handled (101) and reaches the process of playing back the data (103) or flows to a function selecting items (105) in which a temporary discard (106), a complete abandon (107), a state display (112) of a storage unit, setting of protection from erasion (111), change of a display list (109), or change of a record date and hour (110) is selected. Moreover, when selecting a classification (101), the flow goes to the function selecting items (105) in which a temporary discard (106), a complete abandon (107), a state display of a storage unit (112), or automatic playback is selected. In the playback (103), a move to next data (115), a move to previous data (116), a fast playback (117), a rewind playback (118), or a temporary stop (121) is selected. In the temporary stop (121), a forward frame advance (119) or reverse frame advance (120) is selected. FIG. 2 shows an example of an outer appearance of a portable digital camcorder 200 in which the software program shown in FIG. 1 is executed. This camcorder 200 provides a capability of recording and reproducing an NTSC or PAL TV system signal.

Figure 3:
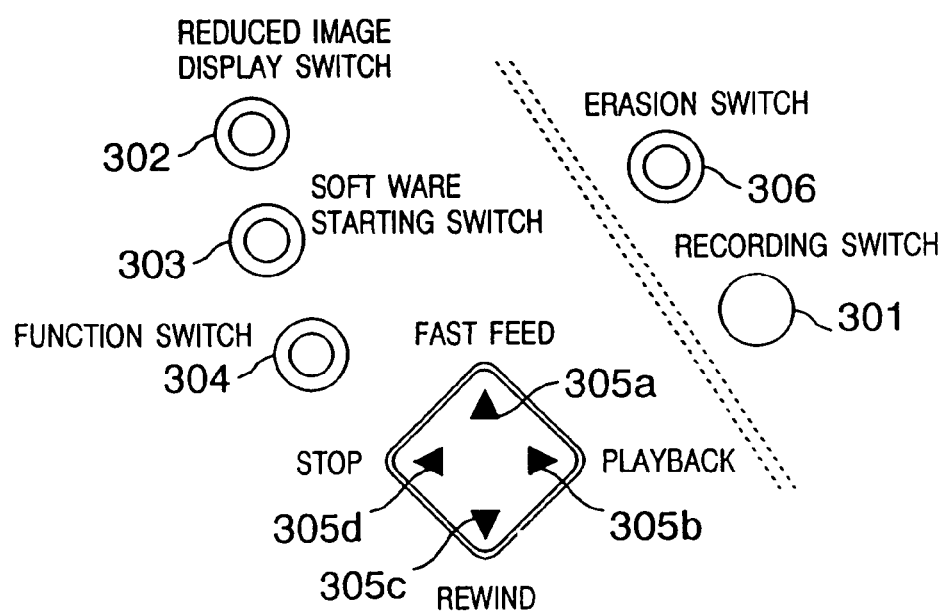
FIG. 3 is an expanded view showing an operating switch portion provided in the portable digital camcorder in which the program of FIG. 1 is executed.

FIG. 3 is an expanded view showing an operating switch portion of the portable digital camcorder shown in FIG. 2. In the portable digital camcorder 200 shown in FIG. 2, with the operating switches, a digital moving signal obtained from the camera system is compressed to one MPEG (Moving Picture Expert Group) format and then is recorded on a hard disk storage medium sized to a memory card. In the playback, with the operating switches, the MPEG1 format signal recorded in a memory card is expanded and then displayed on a display unit 201 built in the camcorder itself. The display unit may be connected to the outside of the camcorder 201. The portable digital camcorder 200 shown in FIG. 2 may recorded the MPEG moving image data as well as the JPEG data for the still images and the MPEG speech format for the speech data.

Figure 4:
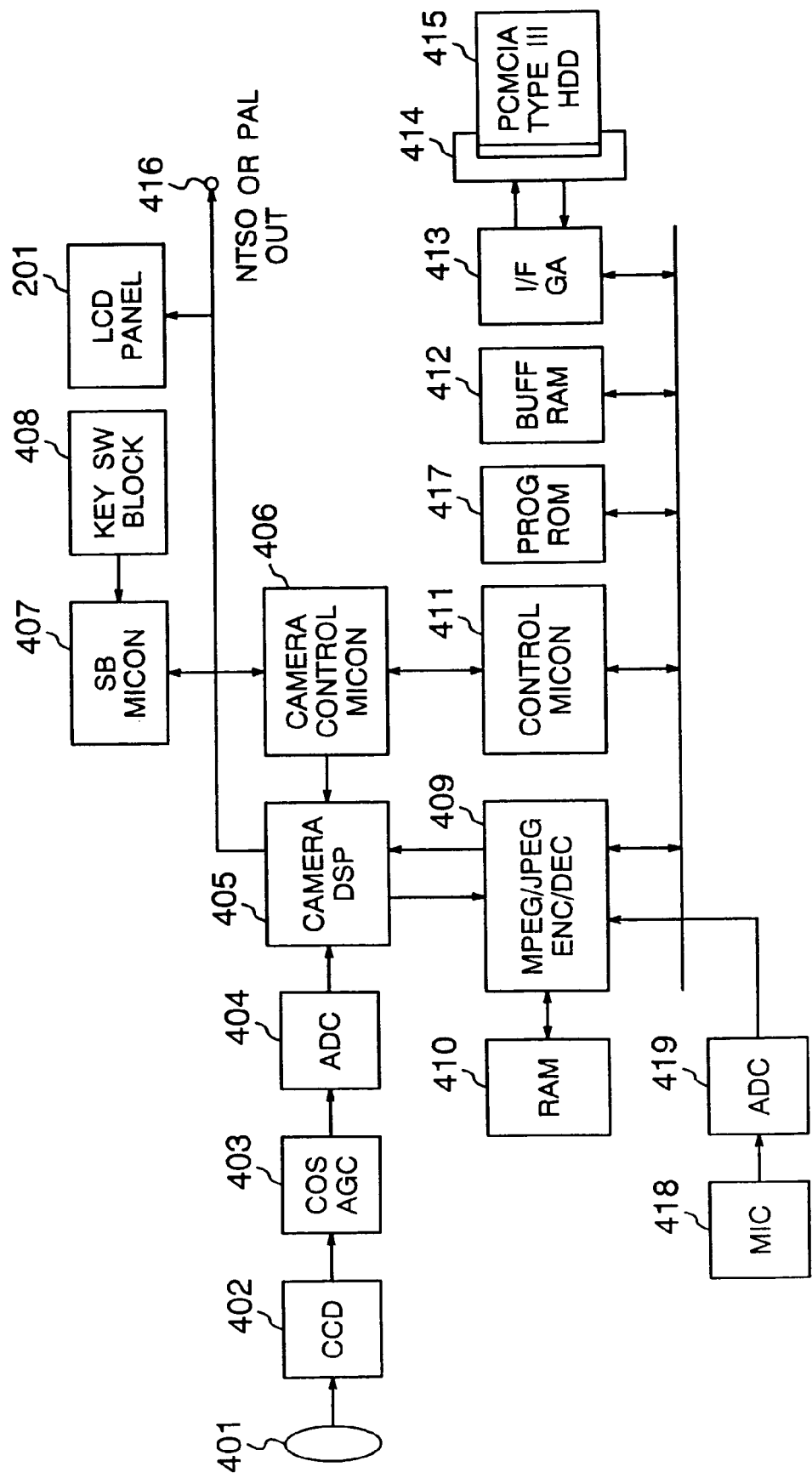
FIG. 4 is a circuit diagram showing an arrangement of a portable digital camcorder in which the program of FIG. 1 is executed.

FIG. 4 schematically shows a circuit arrangement of the portable digital comcorder 200. At first, the description will be oriented to the procedure of recording the moving image through the portable digital camcorder 200. When a user presses a recording switch 301, an image of an object obtained through a lens 401 is converted into the corresponding electric signal through the effect of a CCD sensor 402. The signal read out of a sensor is electrically processed through a CDS (Correlated Double Sampling) circuit for suppressing the low-frequency noises of the signal and a circuit 403 integrated with a AGC circuit for controlling an automatic gain of the signal for stabilizing the signal level. Then, the processed signal is converted into a digital signal through an ADC 404 and then is applied to a camera signal processing circuit 405.

A camera signal processing circuit (camera DSP) 405 is configured of a function of converting a digital pixel signal from the sensor into a luminance signal Y and color difference signals U and V, a function of adding a synchronous signal, a function of controlling relation between an iris and a shutter speed, a function of adjusting a white balance, and a function of digitally zooming in or out the signal. Though not illustrated in detail in FIG. 4, the camera DSP 405 is operated to feed a horizontal and a vertical driving signal pulses to the CCD sensor 402 and read the signal from the CCD sensor 402 as adjusting the timing between the synchronous signal and the pulses. Moreover, a camera control microcomputer 406 is operated to feed operating parameters for the DSP 405 to the camera DSP 405 in order to control the overall camera system.

On the other hand, the digital luminance signal Y and the digital color difference signals U and V obtained by the camera DSP 405 are sent to an MPEG1 encoder 409 through a digital bus line. The MPEG1 is a standard compression format for the digital signal for a moving image. The encoder 409 operates to compress the data according to the MPEG1 format and then convert it into the digital data. A numeral 410 denotes a working memory used in encoding the data according to the MPEG1 format. The data converted into the MPEG1 format is sent to a microcomputer 411 for controlling a transmission rate of the digital output data. The MPEG1 encoder 409, the working memory 410 and the microcomputer 411 compose the overall system for compressing the moving image.

The microcomputer 411 for controlling the transmission rate stores a constant amount of MPEG1-formatted data in a buffer memory 412. The formatted data is passed through an interface circuit 413 and a card connector 414 and reaches a hard disk drive 415. The card connector 414 is configured on the PCMCIA standards and thus contains 68 pins. The hard disk drive 415 is sized to a memory card and subject to the PC card standards defined by the PCMCIA (Personal Computer Memory Card International Association).

The foregoing description has concerned with the method for recording the moving image. In case the still image recording mode is selected by the user, the MPEG encoder 409 is switched to a JPEG compressing circuit. Then, a still image data is generated at the encoder 409 and then transferred to the microcomputer 411 for doing the same operation as described above. The MPEG compression data process and the JPEG compression data process have the same common points, so that the use of both the data formats may effectively save the circuit scale. This is a well-known method for saving the circuitry.

Further, the speech signal is converted into an analog electric signal through a microphone 418. The analog electric signal is sent to a speech ADC 419 for converting the analog electric signal into the corresponding digital data. The digital speech data is applied into the data bus through the effect of the MPEG encoder 409. Then, the microcomputer 411 performs the MPEG-format-based compression through the program run therein so that the digital speech data is added to the moving image data or the still image data in precise time sequences.

According to this embodiment, the portable digital camcorder 200 is arranged to record the MPEG1-formatted data, the JPEG-formatted data, and the MPEG1-formatted speed data.

In recording the data, the microcomputer 411 also enables to record a data, a time, and a symbol for representing any one of the MPEG1-formatted data, the JPEG-formatted data, and the MPEG1-formatted data on a time when the recording switch 301 is pressed. At a time, the microcomputer 411 enables to record a symbol for representing a classification for retrieving the recorded data and a symbol for representing whether or not the operation of erasing the recorded data is prohibited. In recording the data, the classification symbol is recorded as "not classified" and the deletion symbol is recorded as "erasable".

In the general disk operating system, the symbol for indicating the imaging mode is discriminated using a code for a data type. The symbol for representing the classification and the symbol for representing if the data is erased are recorded in the corresponding files.

On the other hand, when recording the data, a digital signal applied to the camera DSP 405 as a monitoring signal is converted into an analog TV signal through the effect of an NTSC or PAL encoder built in the circuit 405 and then is fed at an output terminal 416 and the built-in display unit 201. The foregoing description has concerned with the MPEG1-formatted moving image data with the speech. In actual, the JPEG-formatted data or the MPEG1-formatted speech data may be solely processed in the similar manner to the above operation.

Figure 16:
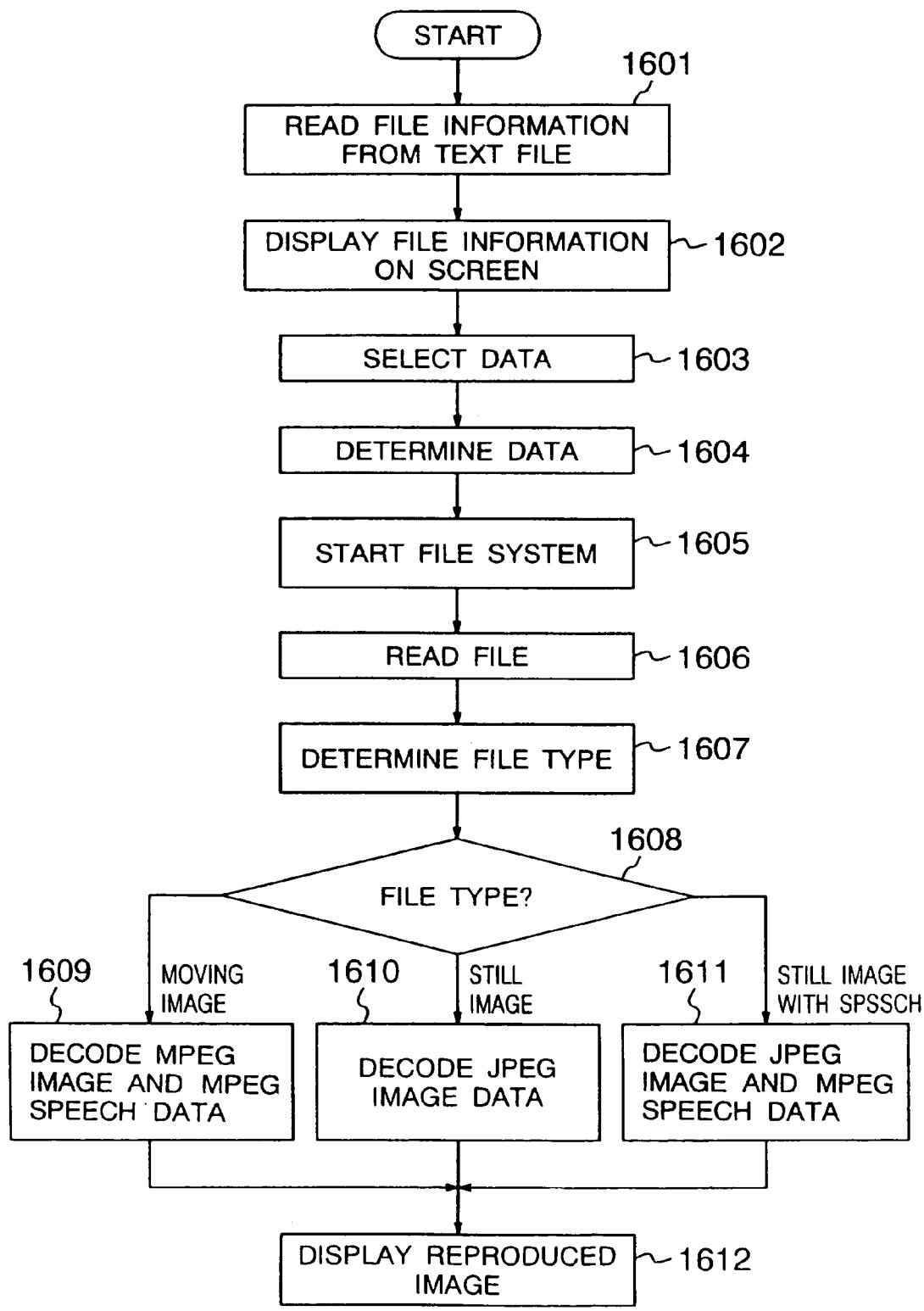
FIG. 16 is a flowchart showing a method for reading recorded data from a hard disk driver and reproducing it.

When the system stays at the playback mode, the signal flows in an opposite manner to the flow at the recording mode. FIG. 16 is a flowchart showing the reproduction of the signal. Text data indicating information of data is read from the hard disk drive 415 (step 1601). Next, the user retrieves data from a list of data displayed on the built-in display unit 201 and specifies the data to be played back with the operating switch 408 (step 1604). The list of the recorded data displayed on the display unit 201 is a feature of the invention. With the specification, a file system is started (step 1605) so that the data is read out of the hard disk drive 415 and then sent to the microcomputer 411 (step 1606).

Then, the data type is discriminated (steps 1607 and 1608). If the recorded data is the moving image, the MPEG-formatted moving image data and the MPEG-formatted speech data are both decoded (step 1609). If the recorded data is the still image, the JPEG-formatted still image data is decoded (step 1610). If the recorded data is the still image with the speech, the JPEG-formatted still image data and the MPEG-formatted speech data are both decoded (step 1611). Then, the decoded image and the decoded speech if any are displayed on the screen (step 1612).

An indication signal issued by the operating switch 408 is read by a sub-microcomputer 407 and then is sent to the microcomputer 411 through a camera-controlling microcomputer 406. The software program according to this embodiment is read out of a ROM 417 (Read-only Memory) for storing a program and then is executed. In this embodiment, the program is stored in the ROM 417. In place of the ROM 417, another storage unit such as a flash RAM or a hard disk drive may be used for the purpose.

Next, the data is transferred to the buffer memory 412 through the PCMCIA connector 414 and the interface circuit 413. The timing of the data stored in the buffer memory 412 is controlled by the microcomputer 411. Then, the data whose timing is adjusted is sent to the MPEG1 decoder 409. The decoder 409 switches the MPEG1 coding to the MPEG1 decoding or vice versa.

The data decoded by the MPEG1 decoder 409 is sent to the camera DSP circuit 405 through the digital path line. The decoded data is converted into an analog video signal through the effect of an NTSC or PAL encoder and a DAC built in the circuit 405 and then is led at an output terminal 416 and from the built-in display unit 201 to the outside of the apparatus. The foregoing description has concerned with the MPEG1-formatted moving picture data with the speech. The JPEG-formatted still image data or the MPEG1-formatted speech data may be solely processed in the same manner as described above.

The portable comcorder of this embodiment is arranged to use a hard disk unit of 260 MB for the hard disk drive 415. In case that only the JPEG-formatted still image data is recorded, about 3000 still images may be recorded. In actual, the portable comcorder of this invention enables to retrieve 3000 items of data quickly and easily using the classifying function.

FIG. 4 shows a circuit arrangement about the moving image. The corresponding circuit arrangement to that of FIG. 4 is required for the still images and the speech. That is, the portable comcorder of this embodiment is arranged to have a general-purpose means for imaging a moving object/a still object, a microphone, means for digitally converting a moving image/a still image, means for digitally converting speech, and means for digitally recording a moving image, a still image, and a speech signal.

Figure 5:
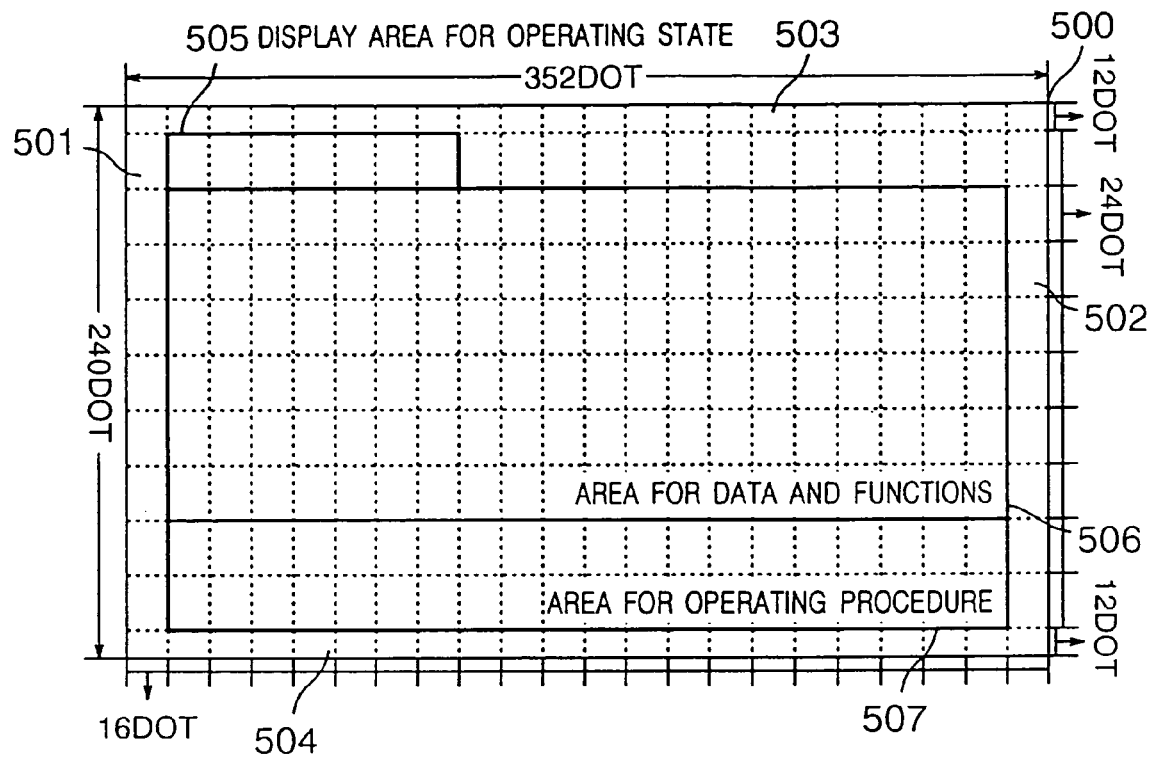
FIG. 5 is a view showing a display screen provided in the portable digital camcorder in which the program of FIG. 1 is executed.

FIG. 5 shows the screen of the built-in display unit 201 used in the embodiment of the invention, in which the diagonal length is 1.8 inch (45.7 mm), the horizontal length is 36.6 mm, and the vertical length is 27 mm. The illustrated screen arrangement uses a liquid crystal consisting of 352 pixels and 240 pixels. In order to reduce the power consumption and the size of the portable digital camcorder 200, the 1.8-inch liquid crystal is used for the built-in display unit 201. This built-in display unit 201 shows an imaging screen formed by a monitoring signal when recording the signal, a retrieval screen formed by the program when retrieving the data, and a playback screen formed by the decoded data when playing back the data.

In recording the data, the moving image recording mode (MPEG compression recording mode) or the still image recording mode (JPEG compression recording mode) may be switched each time the mode selecting button is pressed. As the user can select the recording mode with this button, as shown in FIGS. 17 and 18, the mark for each mode located in the upper left portion of the imaging screen is switched each time the mode is switched.

Figure 17:
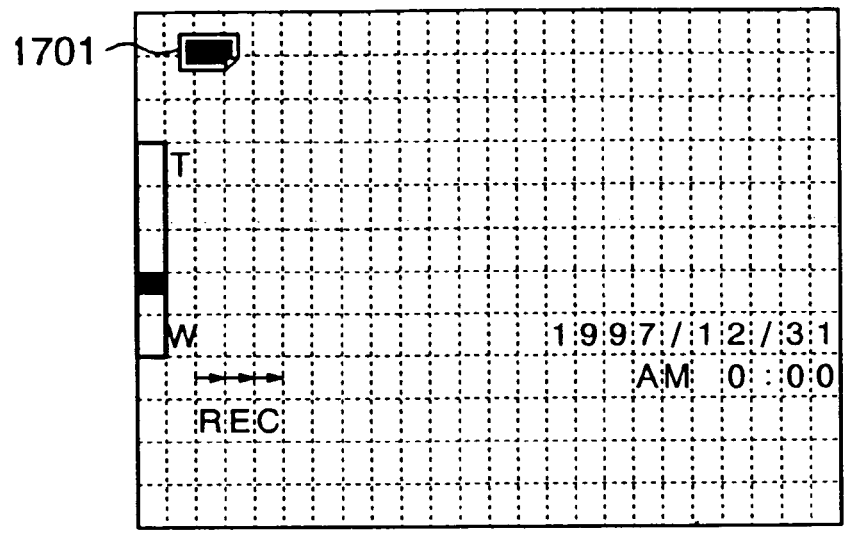
FIG. 17 is a view showing an imaged screen appearing if a still image recording mode is selected when recording an image.
Figure 18:
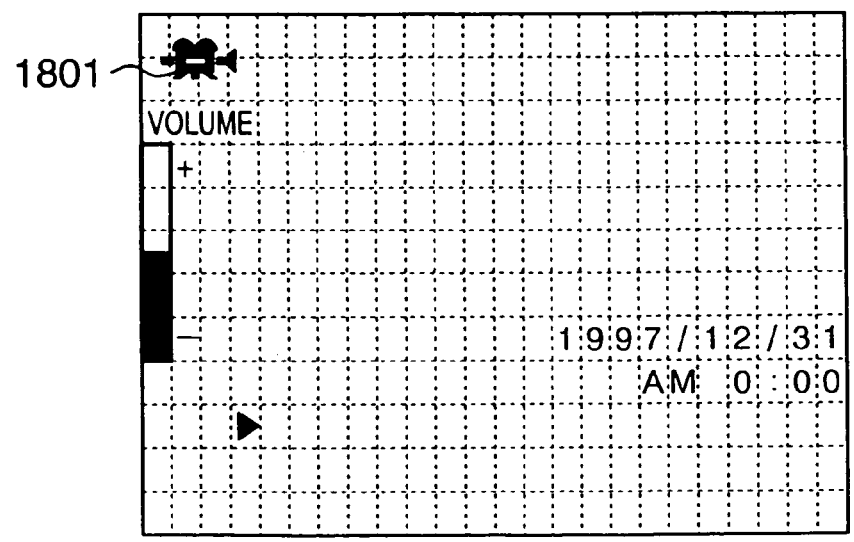
FIG. 18 is a view showing an imaged screen appearing if a moving image recording mode is selected when recording an image.

FIG. 17 shows the imaging screen appearing when the still image recording mode is selected when recording data. In FIG. 17, a numeral 1701 denotes a mark representing a still image mode. FIG. 18 shows the imaging screen appearing when the moving image recording mode is selected when recording data. In FIG. 18, a numeral 1801 denotes a mark representing the moving image mode. The mark for each mode appears on the screen so that the user can visually recognize the current imaging mode as he or she is pushing the mode selecting button. This mark allows the user to handle the camcorder without having to keep his eyes out of the imaging screen. It means that the digital comcorder offers convenient operativity to the user.

Figure 19:
FIG. 19 is a view showing marks for modes.
Figure 19:
Figure 19:
Figure 19:

The mark for each mode is displayed on the retrieving screen through the effect of the program sent from a data containing unit. The retrieving screen will be discussed in detail together with the display of the mode mark. FIG. 19 shows the concrete mark for each mode. In actual, however, the marks are not limited to the illustrative ones. Any mark may be used if it can distinguish the modes from each other.

In FIG. 5, the display screen 500 consists of 20×9 characters at maximum, each character consisting of 16 and 24 pixels. The character size consisting of 16×24 pixels keeps the maximum recognizable size compatible with efficient digitizing of the character data. The blanks of a left side 501, a right side 502, an upper side 503, and a lower side 504 of the screen are secured because the display unit or the built-in display unit 201 connected to an output terminal 416 disables to display the overall area of the main screen.

A numeral 505 denotes an operating state display area where the operating state of the program of this embodiment is displayed. A numeral 506 denotes an area where the information of the recorded data and the functions to be operated for specifying the data details of the data by pressing a function switch 304 are displayed as individual items in partitioned sub-screens. A numeral 507 denotes an area where an operating procedure suggests the operating method to the user.

Figure 6:
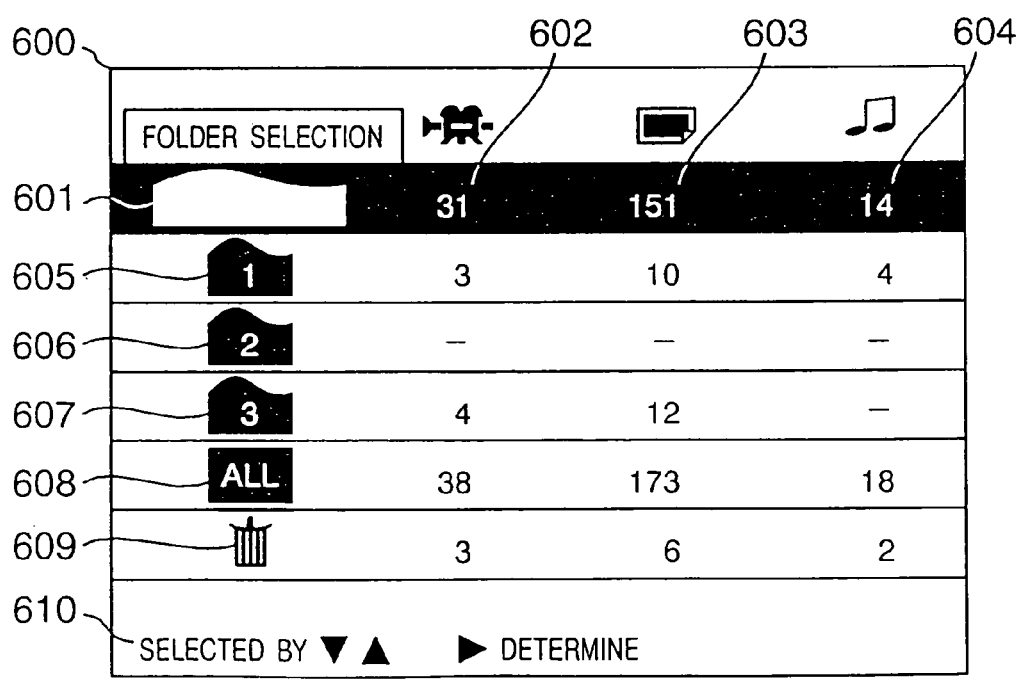
FIG. 6 is a view showing a display screen on which the recorded data is classified.

FIG. 6 shows a display screen 600 appearing when a program starting switch 303 is pressed by the user for starting the program of this embodiment. The display screen 600 corresponds to a classifying selection 101 of FIG. 1 for indicating the state transition of the operation. As mentioned earlier, the data recorded by the user is unconditionally recorded "unclassified" when recording the data. The figure (number of files) displayed on the "unclassified" row stands for the number of MPEG1-formatted moving image data items with the speech 602, the number of JPEG-formatted still image data pieces 603, and the number of MPEG1-formatted speech 604.

Likewise, the figure displayed on each row of a mark 605 for indicating the first classification, a mark 606 for indicating the second classification, and a mark 607 for indicating the third classification indicate the numbers of data items arbitrarily classified by the user, respectively. A mark 608 for indicating all data items at a batch indicates the total number of the data items on the "unclassified" row 601, the "first classified" row 605, the "second classified" row 606, and the "third classified" row 607.

A mark 609 for indicating the "temporary discard" means a classification for temporarily discarding the data items so that the user cannot erroneously erase the data items. With the mark 609, the user can temporarily move the "unclassified", "first classified", "second classified", and "third classified" data items to the "temporary discard" row. The figure represented on the row of the mark 609 does not contain a figure represented on the row of the mark 608 for indicating all data items at a batch.

In FIG. 6, the row of the mark 601 for indicating the unclassification is reversed to the rows of the other marks. It indicates that the mark 601 for indicating the unclassification is the selected item. In place of the reversing, another kind of way may be used such as change of a color. The software program is executed by the user so that the recorded data items whose classifying destinations are not changed are contained in the row of the mark 601 for indicating the unclassification.

When the upper arrow switch 305a of FIG. 3 is pressed by the user, the selected item is shifted upward by one row, while the lower arrow switch 305c is pressed, the selected item is shifted downward by one row.

In case that the selected item is an item on the first row of the display area 506, that is, on the mark 601 for indicating the unclassification, when the user presses the upper arrow switch 305a, the selected item is shifted to the item on the sixth row of the display area 506, that is, on the mark 609 for indicating the temporary discard. In case that the selected item is an item on the sixth row of the display area 506, that is, on the mark 609 for indicating the temporary discard, when the user presses the lower arrow 503c, the selected item is shifted to the item on the first row of the display area 506, that is, on the mark 601 for indicating the unclassification.

When the user presses the right arrow switch 305b, the display screen is shifted into the screen on which the content of the classification of the selected row is represented.

Moreover, the guide indication 610 for the operating procedure is displayed so as to remind the user of the operation.

Figure 7:
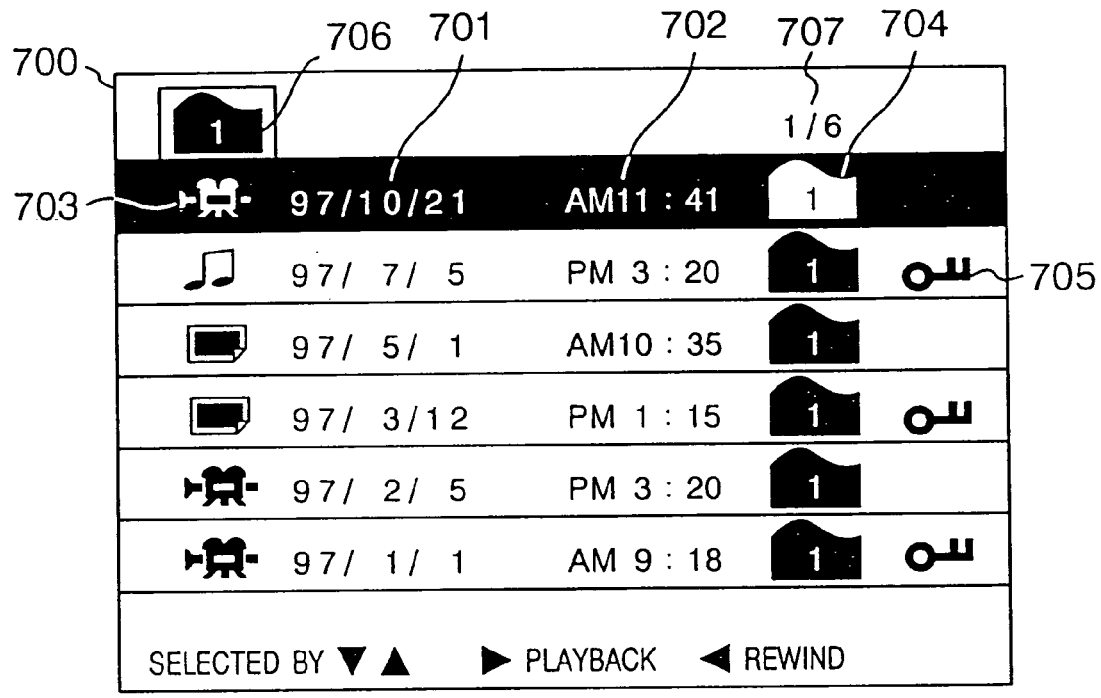
FIG. 7 is a view showing a display screen on which the recorded data is selected.

As an example, FIG. 7 shows a display screen 700 on which the mark 605 for indicating the first classification is selected so that the data items on the row of the mark 605 appear as ones to be selected if the right arrow switch 305b is pressed by the user. This function corresponds to the data selection 102 shown in FIG. 1.

The display screen 700 is a screen on which a data item is to be retrieved from a data list and played back. The data list is a feature of the present invention. On the screen 700, the data items recorded by the portable digital camcorder 200 may be listed using a mark 703 for representing a sort of data content of a recording start time 702, a moving image, a still image, and a speech, a classifying mark 704, and a mark 705 for protecting data from being erased by the erroneous operation.

The data items displayed on the screen 700 are ranged from the top to the down in the sequence of the recording year/month/day 701 and the recording start time 702. Hence, the latest recorded data is listed on the topmost row, so that the user can effectively retrieve the data. The number of the pages of the displayed lists is checked, so that the lists are displayed as pages as indicated by a numeral 707. In the page display 707, a denominator indicates all the list pages, while a numerator indicates the current one of the list pages.

The imaging status of the user such as the recording date and time and the data type are automatically recorded as the aforementioned information, so that the user can manually record these pieces of information. Since the user may optionally change the classifying destination according to his or her purpose, the user's retrieval work for the destination data is made simpler and more efficient.

These pieces of information are all composed of a list represented in characters. This does not need a time consumed in expanding the compressed image data recorded on the media. Further, if the user selects a data item using the operating button, the screen can be rewound quickly, so that the quick retrieval is made possible.

This list retrieving operation may offer comfortable operativity without having to impose stress on the user who wants to quickly select the recorded image.

The selecting classification 706 indicates a classification selected by a display screen 600. This embodiment has concerned with the user's selection of the first classification 605 on the display screen 600.

The display list of the data items on the display screens 700 and 800 is arranged in the sequence of recording the data on the hard disk drive 415, that is, in the sequence that the latest data item comes to the topmost row. Since the user may change the sequence of recording the data items on the hard disk driver 415, he or she may change the display sequence. The data immediately after imaging is recorded on the topmost row (701 of FIGS. 7 and 8) of the display area 506 on the unclassified data selecting screen. If the user makes sure of the just imaged data, he or she only reproduces the data and makes sure of the topmost row of the display area 506 on the unclassified data selecting screen.

Like the display screen 600, when the user presses the upper arrow switch 305a, the selected data item is shifted upward by one row. When the user presses the lower arrow switch 305c, the selected data item is shifted downward by one row. In this embodiment, the six rows of the data items are displayed on one screen. In case the user selects the sixth data item, if the lower arrow switch 305c is pressed, the seventh data item is displayed on the first row of the display area 506. It means that the seventh data item is the selected item. The eighth, the ninth and the following data items are displayed on the second, the third, and the following rows, respectively.

On the other hand, for example, in case the seventh data item is selected, if the upper arrow switch 305a is pressed, the seventh data item is displayed on the first row of the display area 506. The second, the third, the fourth, the fifth, and the sixth data items are respectively displayed on the rows after the first one, so the selected data item is changed to the sixth data item.

That is, the n-th data item is displayed on a remainder-th row on the display area 506, in which the remainder is obtained by dividing n by 6.

Figure 8:
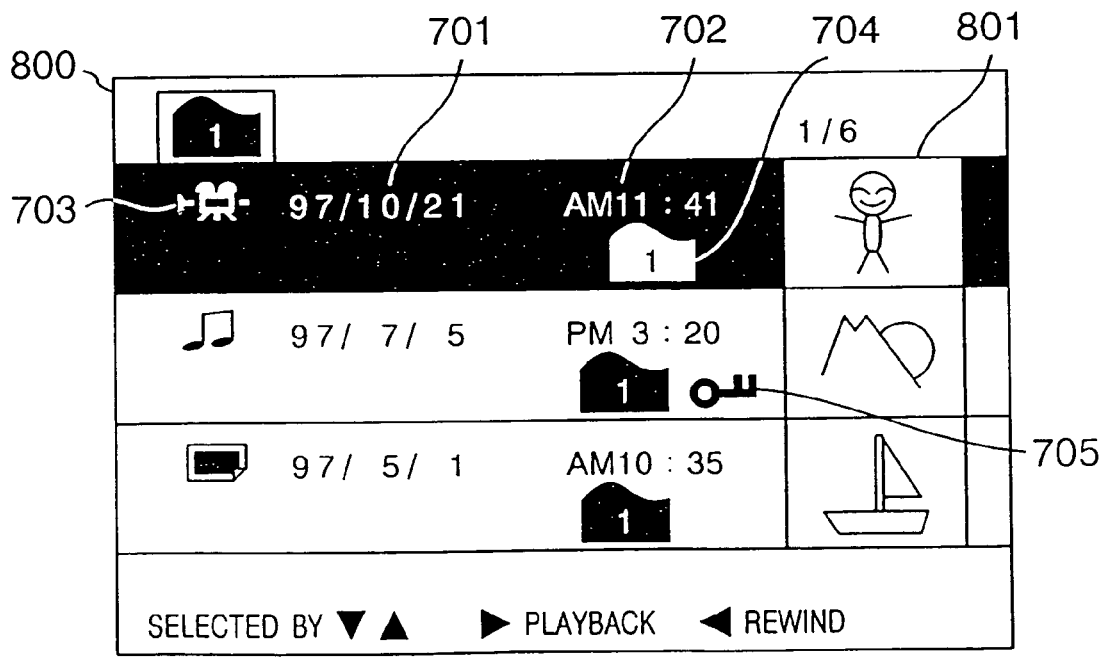
FIG. 8 is a view showing a display screen with expanded images in which the recorded data is selected.
Figure 9:
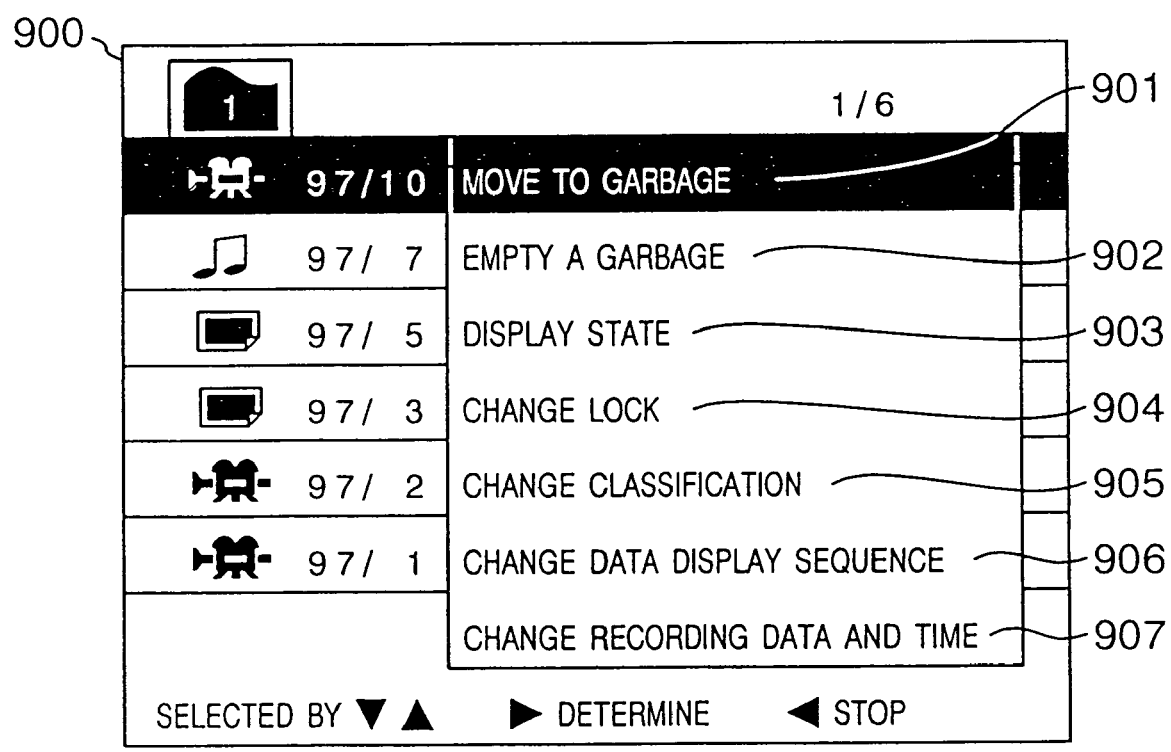
FIG. 9 is a view showing a display screen on which the function details of the recorded data are selected.

In case the head data item or the tail one is selected, if the upper arrow switch 305a or the lower arrow switch 305c is pressed, like the display screen 600, the data items containing the head and the tail items are displayed as a list so that the head or the tail data item is selected. Though FIG. 6 shows the one-page screen on which the number of folders is fixed, FIGS. 7 and 8 show the screen on which the pages are increased or decreased in number according to the number of data items.

If the user selects the upper arrow switch 305a and the lower arrow switch 305c shown in FIG. 3 and depresses the right arrow switch 305, the selected data is fed out of the output terminal 416 and is played back on the built-in display unit 201.

While the data is being played back, the upper arrow switch 305a, the lower arrow with 305c, and the left arrow switch 30, as shown in FIG. 3, are served as fast feed, rewind, and stop, respectively. While the data is being played back, if the left arrow switch 305d served as a stop switch is pressed by the user, the playback is stopped, and the display screen 700 is displayed again. The state transition during the data playback is denoted by a numeral 103 of FIG. 1.

Next, the description will be oriented to the display content on which reduced images are added to the recording date and time so that the content of the data may be easily recognized. In the state of the display screen 700, if the user presses the reduced image display switch 302, a reduced image 801 of the first frame of the data listed on the subject row is displayed on the display screen 800 shown in FIG. 8. This makes it possible to surprisingly enhance the retrieval of the data. The state transition in the reduced image display function is denoted by a numeral 104 of FIG. 1.

For example, in case that the viewable area of the 1.8-inch built-in LCD display unit 201 consists of 379 dots in horizontal and 220 dots in vertical, the reduced image 801 is adjusted to consist of 64 dots in horizontal and 48 dots in vertical. (if the LCD panel consists of 352 and 240 dots, the reduced image 801 consists of 240/48=5 dots in vertical and 352/5=70.4 in horizontal. From a vertical viewpoint, the reduced image is one-fifth and from a horizontal viewpoint, the reduced image is one-fifth with a slight margin.) In this reduction, three reduced images, the recording starting year month day 701, the recording starting time 702, the mark 703 representing the content type of the data indicating the moving image, the still image, and the speech, the classification mark 704, and the mark 705 for protecting the data from being erroneously erased can be all displayed on one screen. This screen arrangement makes it possible to secure more visible reduced images on the display. Like the display screen 700, on this display screen 800, the data may be played back by pressing the operating button 305 and the like.

In this state, if the reduced image display switch 302 is pressed again, the display screen is returned to the display screen 600 for displaying the data classification. The reduced image is depicted in the RAM 410 shown in the circuit block of FIG. 4 through the effect of the control microcomputer 411 and the MPEG encoder 409.

In turn, the description will be oriented to a function selecting display screen 900 for easily changing the display state from the data selecting display screen 700. The function selecting display screen 900 includes the reduced number of operation switches and function items displayed thereon so that the ease of use in operation may be improved as viewing the screen. The operating switches 304, 305a, 305b, 305c, and 305d shown in FIG. 3 implement the operating system for selectively operating the function. The state transition on the display screen 900 is denoted by a numeral 105 of FIG. 1.

On the reduced image display screen 800, the function selecting display screen 900 is displayed by the same procedure. On the display screen 600, the display screen having the necessary functions such as "empty a garbage", "move to a garbage", "display a state", and "auto play" shown in FIG. 1 is displayed by the same procedure. In this case, the function items on the display screen 900 are not required to be identical with the function items on the data classifying display screen 600.

Figure 10:
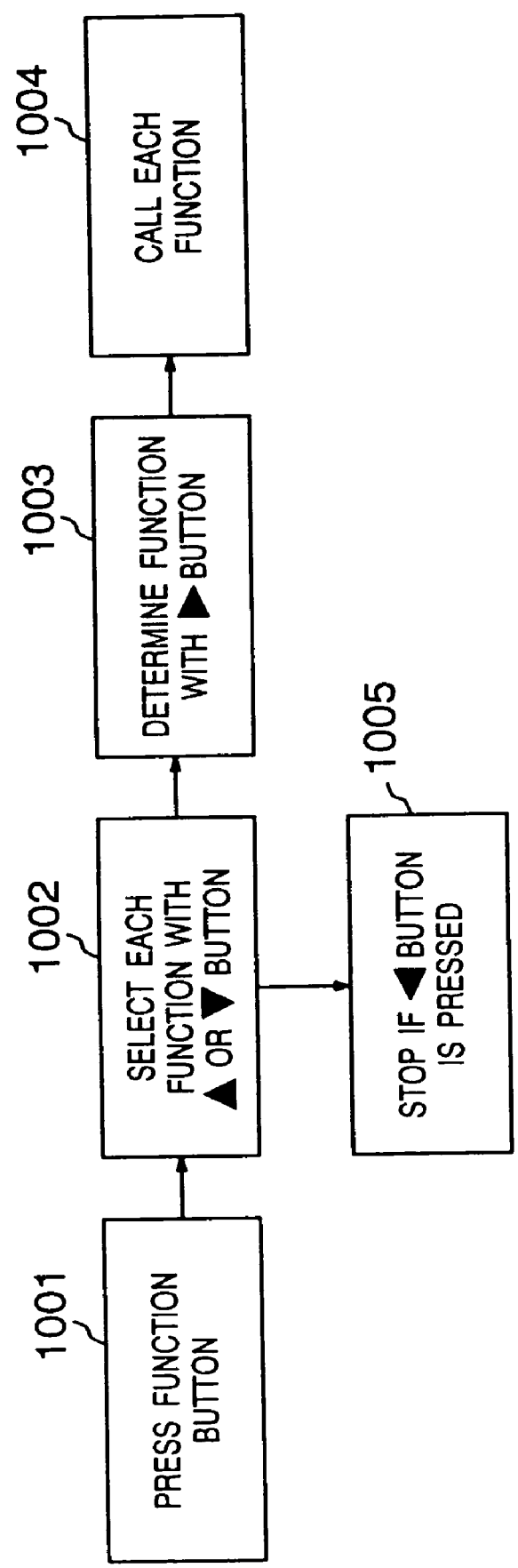
FIG. 10 is a flowchart showing a method for selecting the function details.

The flow of operation on the display screen 900 is shown in FIG. 10. The display screen 900 is displayed when the user pressed the function switch 304 on the display screen 700 (step 1001). The selective movement of each item is indicated by the upper arrow switch 305a and the switch lower arrow switch 305c. If the user pressed the upper arrow switch 305a, the selected data item is moved upward by one row. If the lower arrow switch 305c is pressed, the selected data item is moved downward by one row (step 1002). If the user presses the right arrow switch 305b (step 1003), the function of the selected data item is executed (step 1004). If the left arrow function switch 305d is pressed, the display screen 900 is returned to the data selecting display screen 700 (step 1005).

As mentioned earlier, in this embodiment, the erasion of the data is realized by moving the data to the temporary discard location and then erase the data contained in the temporary discard location. The state transition of this function is denoted by a numeral 106 of FIG. 1.

The procedure of erasing the data will be described below.

If the data is erased, the data is moved to the temporary discard location. In this case, the procedure for selectively executing "move the data to a garbage" will be described with reference to FIG. 9.

At first, on the display screen 700, the user selects the data item to be temporarily discarded with the upper arrow switch 305a and the lower arrow operating switch 305c and then depresses the function switch 304. Then, the display screen 700 is changed to the display screen 900. The user selects the "move data to a garbage" 901 with the upper arrow operation switch 305a and the lower arrow function switch 305c and then depresses the right arrow switch 305b. Then, the selected data item is moved to the garbage that is the temporary discard location. If the user presses the switch 306, the similarly selected data is moved to the garbage.

When the user selects the "empty a garbage" 902 on the display screen 900, all the data items left in the garbage are erased. The state transition of this function is denoted by a numeral 107 of FIG. 1.

In the operating system, the user is required to do two operations for erasing the data. The two operations protect the data from the user's erroneous erasure.

As mentioned earlier, when recording the data, the classifying symbol to be allocated to each data item is an unclassified one. When playing back the data, the classification may be changed by the user's operation. This classifying function is used for classifying the data item. Hence, since the user classifies the data item for each destination, the ease of use of the retrieval may be surprisingly enhanced. The state transition of this function is denoted by a numeral 108 of FIG. 1.

Later, the description will be oriented to the procedure for changing the data classification. On the display screen 700, the user selects the data item whose classification is to be changed with the upper arrow switch 305a or the lower arrow operation switch 305c and then presses the function switch 304. Then, the display screen is changed to the display screen 900. The user selects the "change a group" 905 that is a function of changing the classification with the upper arrow operation switch 305a and the lower arrow operation switch 305c and then presses the right arrow switch 305b. Then, a display screen 1100 is displayed on which the classification of the selected data shown in FIG. 11 is changed.

If the right arrow switch 305b is pressed on the display screen 1100, the classification is cyclically changed from "unclassification" to 1 to 2 to 3 to "unclassification". In this embodiment, the update of the symbol for the classification according to the display screen is executed by the control microcomputer 411 at a time when the user presses the left arrow switch 305d and the display screen 600 appears. This is intended for enhancing the processing speed and retrying the user's operation.

As described earlier, unless the user does the following operation, the list indicated on the display screen 700 is arranged in the recording sequence of the recorded data. When playing back the data, the sequence may be changed so as to implement a simple editing function. The state transition of this function is denoted by a numeral 109 of FIG. 1.

The procedure of changing the data displaying sequence will be described below. At first, on the display screen 700, the user selects the data item whose displaying sequence is to be changed with the upper arrow switch 305a and the lower arrow switch 305c. Then, if the function switch 304 is pressed, the display screen 900 is displayed.

The user selects the "change a data display sequence" 906 that is a function of changing the display sequence with the lower arrow switch 305c and depresses the right arrow switch 305b. Then, the display screen 1200 shown in FIG. 12 is displayed, so that the display sequence of the selected data item may be changed. Next, the user specifies the location where the selected data is to be inserted with the upper arrow switch 305a and the lower arrow switch 305c. Then, if the right arrow switch 305b is pressed, the selected data item is inserted to the specified location. In this case, the sequence of the data item located after the specified location is shifted lower by one.

The portable digital camcorder 200 of this embodiment incorporates an internal clock for displaying on the display screen 700 the date and the time when the data is recorded. However, if failure such as run-down of a battery takes place while imaging an object, the recorded data and time may not be correctly displayed on the display screen 700. In this embodiment, the user may operate to optionally change the date and time when the data is recorded. The state transition of this function is denoted by a numeral 110 of FIG. 1.

Figure 13:
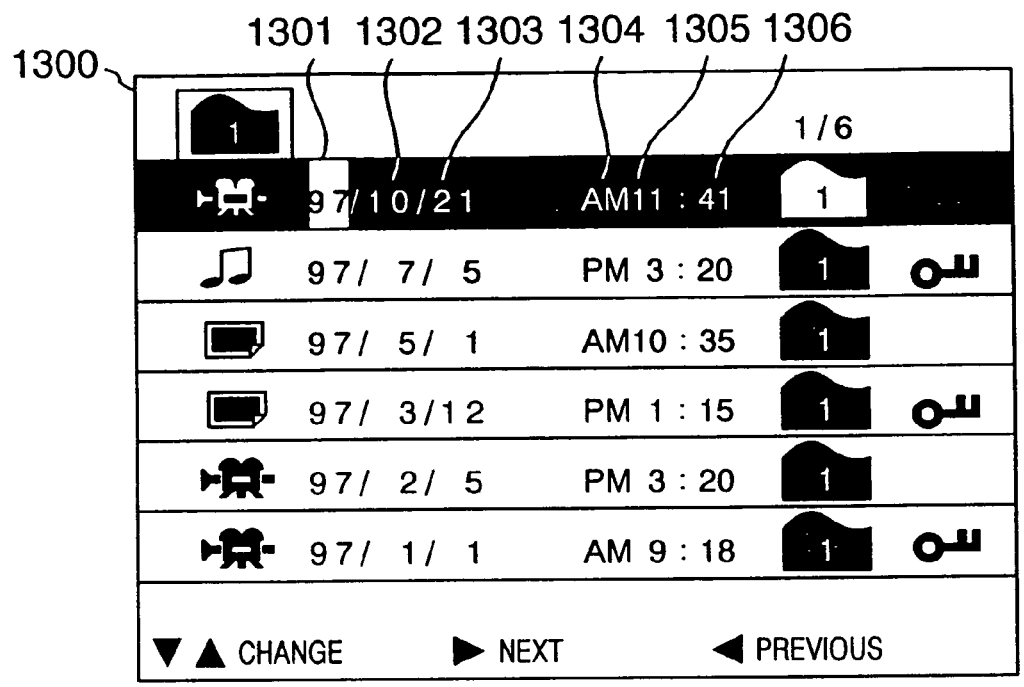
FIG. 13 is a view showing a display screen on which each date of the recorded data is changed.

Later, the description will be oriented to the procedure for changing the date and time. The user selects the data whose recording date and time are to be changed using the upper arrow switch 305a and the lower arrow switch 305c. Then, if the function switch 304 is pressed, the display screen 900 is displayed. The user selects the "change a recording date and time" 907 that is a function of changing the displaying sequence with the upper arrow switch 305a and the lower arrow switch 305c. Next, if the right arrow switch 305b is pressed, the display screen 1300 shown in FIG. 13 is displayed where the recording date and time of the selected data are to be changed.

In this state, when the user pressed the upper arrow switch 305a, the year FIG. 1301 is increased by 1, while the lower arrow switch 305c is pressed, the year FIG. 1301 is decreased by 1. When the right arrow switch 305b is pressed, the year FIG. 1301 is determined as a numeric value represented at the time point. Next, the user may specify the increment or decrement of the numeric value of a month FIG. 1302.

Likewise, if the upper arrow switch 305a is pressed, the month FIG. 1302 is increased by 1, while if the lower arrow switch 305c is pressed, the month FIG. 1302 is decreased by 1. If the right arrow switch 305b is pressed, the month FIG. 1302 is determined as a numerical value displayed at the time point. Next, the user may specify the increment or decrement of a numerical value of a day FIG. 1303.

Further, when the left arrow switch 305d is pressed, the year FIG. 1301 may be retried. The similar operation may be executed to set the day FIG. 1303, an a.m or p.m. indication 1304, a time FIG. 1305, and a minute FIG. 1306. After adjusting a value of the minute FIG. 1306, if the right arrow switch 305b is pressed, the change of the recording date and time is terminated and the date and time of the data is changed to a new numeric value.

In the case of specifying an numeric value that does not exist in the calendar such as February 30, the numeric value is changed to the nearest date (that is, March 1) to the value.

In this embodiment, though the user can freely erase the data, the user may provide the data with an attribute of prohibiting the erasion for preventing the data from being erased. The state transition of this function is denoted by a numeral 111 of FIG. 1.

Figure 14:
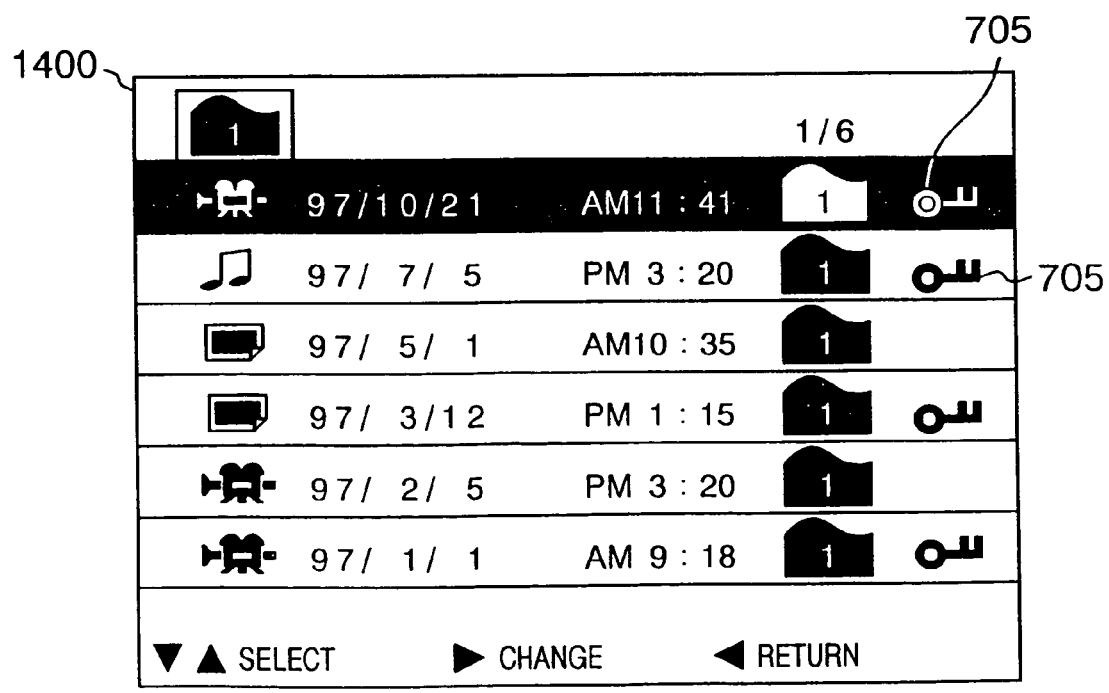
FIG. 14 is a view showing a display screen on which each erasing attribute of the recorded data is changed.

Later, the description will be oriented to the procedure for adding the attribute of protecting the data from the erasion to the data. At first, on the display screen 700, the user selects the data whose erasing attribute is to be changed with the upper arrow switch 305a or the lower arrow switch 305c. Then, the function switch 304 is pressed, so that the display screen 700 is changed to the display screen 900. The user selects the "change a lock" 904 that is a function of changing the erasing attribute with the upper arrow switch 305a or the lower arrow switch 305c. Then, if the right arrow switch 305b is pressed, the display screen 1400 is displayed where the erasing attribute of the selected data shown in FIG. 14 is changed.

When the user pressed the right arrow switch 305b, the erasing attribute is cyclically changed from "disabled" to "enabled" to "disabled". The protecting mark 705 is displayed or not displayed according to the erasing attribute.

In this embodiment, the user can know the remaining volume of the hard disk drive 415. The state transition of this function is denoted by a numeral 112 of FIG.1.

Figure 15:
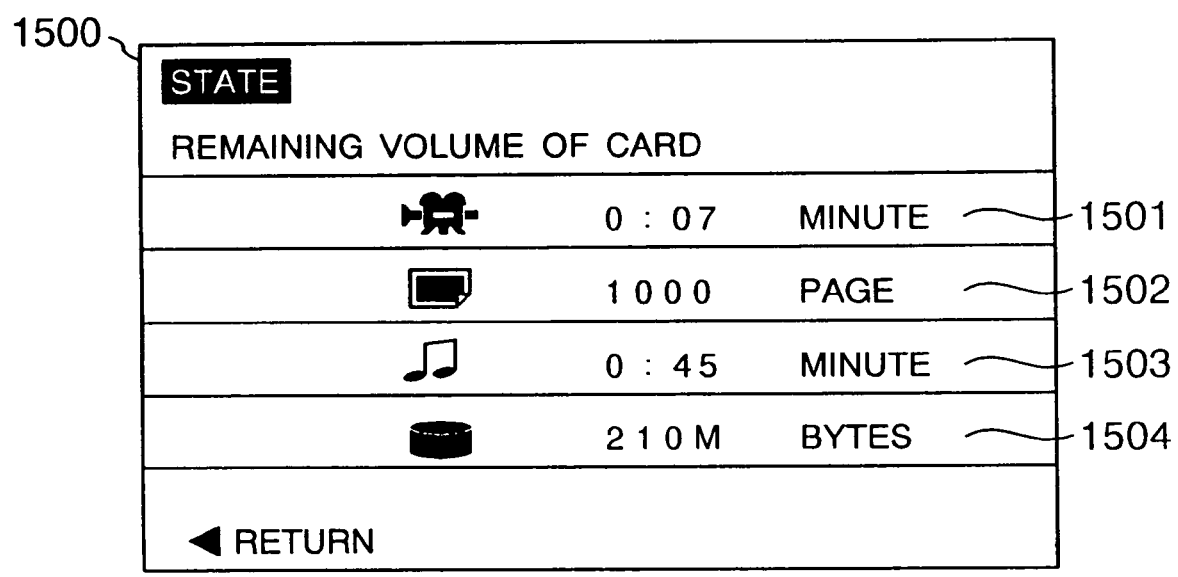
FIG. 15 is a view showing a display screen on which a remaining state of the recording medium is displayed.

Hereafter, the description will be oriented to the procedure for checking the remaining volume of the hard disk drive 415. On the display screen 700, if the user presses the function switch 304, the display screen 700 is changed to the display screen 900. The user selects the "display a state" 903 that is a function of changing the displaying sequence with the upper arrow switch 305a or the lower arrow switch 305c. Then, if the right arrow switch 305b is pressed, the display screen 1500 is displayed where the remaining volume of the hard disk drive 415 shown in FIG. 15 is shown.

On the display screen 1500, a remaining time 1501 left if only the MPEG1-formatted moving image data with the speech is recorded on the hard disk drive 415, a remaining pages left if only the JPEG-formatted still image data is recorded, a remaining time 1503 left if only the MPEG1-formatted speech data is recorded, and a remaining volume 1504 represented in bytes are all displayed as a list. Since the remaining volume of the hard disk drive is listed with respect to each recordable data type, the user can more easily grasp the remaining volume of the hard disk drive 415.

In this embodiment, when playing back the data, the user needs to use only the switches 305a, 305d, 305c and 305d for playing back the data. It is epoch-making that the minimum number of operating switches are just required for playing back the data.

Another epoch-making point is the increase of the functions without increasing the operating buttons by using the functional selecting screen 900.

In this embodiment, as shown in FIG. 6, the classified number of data items is four including "unclassified". The classified number of data may take any value. On the data selecting display screen 700, the data items may be displayed as a list independently of the types of the moving image, the still image, and the speech. This embodiment may apply to the function of automatically classifying the data according to the data type with the user's specification.

Moreover, the control microcomputer 411 is operated to automatically select the data according to the imaging modes such as the moving image and the still image. For example, the user can select only the imaging mode for the still image, pick up only the image type of the still image, and reproduce it.

The foregoing description has been concerned with the specific embodiments of the invention. The present invention may apply to the following arrangement.

For example, the present invention may be achieved by an image recording apparatus which includes converting means for converting a video signal into a digital signal, a codec unit for selectively performing a MPEG system or a JPEG system compression about the digital signal, for generating the compressed data, a recording unit for recording the compressed data, and a selective indicating means for a compression mode, for selectively indicating the MPEG system compression or the JPEG system compression.

This image recording apparatus may be applicably arranged to switch the compressing system of the codec unit according to the indication given by the selective indicating means.

Further, the image recording apparatus may be applicably arranged to add a code for indicating the compression system to the compressed data according to the indication given by the selective indicating means.

Further, the image recording apparatus may be applicably arranged so that the codec unit may be a circuit for performing the MPEG system and the JPEG system processing at one process.

Moreover, the image recording apparatus may be applicably arranged so that the video signal is obtained from an imaging element and the recording unit is a hard disk drive.

The present invention may be also achieved by the image reproducing apparatus which includes a recording unit for receiving compressed data generated according to the MPEG system or the JPEG system and recording the compressed data, specifying means for specifying a data item to be reproduced of the compressed data recorded in the recording unit, readout means for retrieving and reading out the compressed data specified by the specifying means from the recording unit, a codec unit for selectively performing the MPEG system or the JPEG system expansion about the compressed data and generating the digital signal, and converting means for converting the digital signal generated by the codec unit into a video signal.

Moreover, the image reproducing apparatus may be applicably arranged so that the expanding system of the codec unit may be switched according to the compressed data read out of the readout means.

Further, the image reproducing apparatus may be applicably arranged so that the compressed data of the recording unit pre-contains the code indicating the compressing system and the expanding system of the codec unit may be switched according to the code for indicating the compressing system added to the compressed data read out of the readout means.

Further, the image reproducing apparatus may be applicably arranged so that the codec unit may be a circuit for performing the MPEG system and the JPEG system expansion at one process, the video signal is output to the built-in display unit, and the recording unit may be a hard disk drive.

The present invention may be achieved by the image recording and reproducing apparatus for converting a video signal into a digital signal, recording the digital signal, converting the digital signal into the video signal, and reproducing the video signal, which includes a codec unit for selectively performing the MPEG system or the JPEG system compression about the digital signal for generating the compressed data in recording the data and selectively performing the MPEG system or the JPEG system expansion about the compressed data for generating the digital signal in reproducing the data, a recording unit for recording the compressed data, selective indicating means for the compressing mode for selectively indicating the MPEG system compression or the JPEG system compression, specifying means for specifying the data to be reproduced of the compressed data recorded in the recording unit, and readout means for retrieving and reading the compressed data specified by the specifying means from the recording unit.

Moreover, the image recording and reproducing apparatus may be applicably arranged so that the codec unit may switch the compressing system according to the indication given by the selective indicating means in recording the data or the expanding system according to the compressed data read out of the readout means in reproducing the data.

Further, the image recording and reproducing apparatus may be applicably arranged so that in recording the data, the recording unit adds the code for indicating the compressing system to the compressed data according to the indication given by the selective indicating means and records the compressed data and in reproducing the data, the codec unit switches the expanding system according to the code for indicating the compressing system added to the compressed data read out of the readout means.

Moreover, the image recording and reproducing apparatus may be applicably arranged so that the codec unit may be a circuit for performing the MPEG system and the JPEG system processing at one process, the video signal to be recorded is obtained from an imaging element, the video signal to be reproduced is output to the built-in display unit, and the recording unit is a hard disk drive.

As described above, as keeping the capacity of the recording medium larger and advancing the compressing technology, the data items to be recorded on one recording medium are increased in number. This embodiment, however, makes it possible to do the recording and the reproducing operations with quite few keys. Hence, this embodiment offers the below-indicated effects, so that it may improve the operativity even if it is applied to the small-sized apparatus with a limited space prepared for the operation buttons or switches.

This embodiment may display the recording date and time information and the marks for modes such as the moving image, the still image, and the still image with the speech as a list. Hence, the user can efficiently and quickly retrieve the data as grasping the content of the data. In recording the data, the marks are switchably displayed on the imaging screen each time the mode is switched so that the user can grasp the current imaging mode. Hence, the user can focus his or her attention onto the imaging screen at any mode when recording the data.

The display list is composed of a date and a time. The apparatus of this embodiment may automatically create the overall list and at once output the reduced images, so that the user can more easily grasp the content of the data.

The imaged data may be classified to the predetermined locations. Hence, the imaged data may be classified on the mode information and the date and time information according to the imaging statue and the object. This classification makes it easier for the user to retrieve the data.

Further, the displaying sequence of the list and the generating sequence of the data are allowed to be replaced depending on the mode information and the date and time information. Hence, the optimal reproducing effect can be obtained without having to depend on the recording sequence.

Then, the classification of "temporary discard" is provided for preventing the erasion of the data resulting from the user's erroneous operation and reusing the unnecessary data if it is made necessary after being deleted.

As described above, if the operation on the relatively simple graphic screen is executed to record a great deal of data, the function of this embodiment enables to offer quicker retrieval than the conventional function of reproducing the data as expanding all image screens.

The invention claimed is:

1. A recording apparatus comprising:
an input device to which image data as moving picture image data or still picture image data is inputted;
a recorder for recording the inputted image data into a recording medium; an eraser for erasing the recorded moving picture data image or still picture image data in the recording medium;
a protector for protecting from an erasure setting for setting one of a protect from erasure or erasure available by the eraser with respect to the moving picture image data or still picture image data recorded in the recording medium;
a display for displaying a list of reduced pictures of the plurality of moving picture image data or still picture image data recorded in the recording medium;
a controller for controlling an imager, the recorder, the eraser, the protector, and the display;
a functional switch for displaying a functional selecting display screen on the display for selecting erasure by the eraser or prohibition from erasure setting by the protector;
a selective switch for selecting image data of desired reduced pictures among the display in the list of the plurality of moving picture image or still picture image data displayed by selecting erasure by the eraser or setting for protection from erasure by the protector in the functional setting display screen; and
a decision switch for executing erasure by the eraser or setting for protection from erasure by the protector;
wherein the controller:
controls the recorder using a file system;
controls the protector to set erasable by the eraser with respect to moving picture image data while recording the moving picture image data and with respect to still picture image data while recording still picture image data;
displays the list of reduced pictures of the plurality of moving picture image or the still picture image data recorded in the recording medium, and controls the display so as to display a mark for discriminating the moving picture image data and the still picture image data;
controls the protector, while displaying in the list of reduced images of the plurality of moving picture image and still picture image data recorded in the recording medium by the display, after selecting moving picture image data or still picture image data in which the reduced pictures are displayed by the selective switch, displaying the functional selecting display screen in the display the functional switch, selecting the protect from erasure setting by the selective switch so as to set protect from erasure or erasure available by the eraser concerned with the moving picture image data or still picture image data selected by the decision switch;
controls the display, while displaying the list of reduced pictures of the plurality of moving picture image data or still picture image data recorded in the recording medium, so as to display a key mark indicating protection from erasure is set with respect to the moving picture image data or the still picture image data to which protection from erasure is set by the protector;
controls the eraser, while displaying the list of reduced pictures of the plurality of moving picture image data or still picture image data recorded in the recording medium by the display, after selecting the moving picture image data or still picture image of which the reduced pictures are displayed by the selective switch, displaying the functional selective display screen in the display by the functional switch, selecting erasure by the selective switch, so as to erase the moving picture image or still picture image data selected by the decision switch; and
controls the display so as to display a remaining volume of the recording medium.

2. An imaging apparatus comprising:
an input device to which image data is inputted;
a recorder which records the inputted image data from the input device into a recording medium;
an eraser which erases the recorded image data in the recording medium;
a protector which protects from an erasure setting so as to protect from erasure by the eraser of the recorded image data recorded in the recording medium; and
a display which displays a list of reduced images of a plurality of image data recorded in the recording medium;
wherein, while the recorder is controlled utilizing a filing system and the list of reduced images of the plurality of image data recorded in the recording medium is displayed, the display is controlled so as to display a mark indicating that protection from erasure is set with respect to the recorded image data for which protection from erasure is set by the protector.

3. An imaging apparatus in accordance with claim 2, wherein the eraser selects image data for which a desired reduced image is displayed, while displaying the list of reduced images of the plurality of image data recorded in the recording medium, so as to enable erasure of the selected image.

4. An imaging apparatus according to claim 2, wherein the protector selects for protection image data for which desired reduced images are displayed, while displaying the list of reduced images of the plurality of image data recorded in the recording medium, for setting protection from erasure with respect to the selected image data.

5. A recording apparatus comprising:
an input device to which image data is inputted;
a recorder which records inputted image data from the input device into a recording medium;
a display which displays a list of reduced pictures of a plurality of image data recorded in the recording medium;
an eraser for selecting image data displaying a reduced picture, while the display displays a list of reduced pictures of the plurality of image data recorded in the recording medium, for erasing the selected image data;
a protector which protects from an erasure setting for setting a protect from erasure with respect to image data recorded in the recording medium; and
a controller which controls the recorder using a filing system, while protecting from erasure in accordance with a protect from erasure setting, and which controls the display to display a mark indicating that a protect from erasure is set.

6. A recording apparatus according to claim 5, wherein the protector selects image data of a desired reduced picture, while the display displays a list of reduced pictures of the plurality of image data recorded in the recorder, for setting the protect from erasure with respect to the selected image data.

7. A recording apparatus, comprising:
an input device to which image data is inputted; a recorder which records the inputted image data from the input device into a recording medium;
a display which displays a list of reduced pictures of a plurality of image data recorded in the recording medium;
an eraser which erases the recorded image data in the recording medium; a protector which protects from erasure by a setting for selected image data in which desired reduced pictures are displayed, while the display displays a list of reduced pictures of the plurality of image data recorded in the recording medium, and for setting a protect from erasure by the eraser with respect to the selected image data; and
a controller which controls the recorder using a filing system, while the protect from erasure is set by the protector, and which controls the display to display a mark indicating that the protect from erasure is set.

8. A recording apparatus according to claim 7, further comprising:
a functional switch for displaying a functional selecting display screen for selecting either one of erasure by the eraser or protect from erasure setting by the protector;
a selective switch for selecting image data in which a desired reduced picture is displayed among the reduced pictures of the plurality of image data recorded in the recording medium which is displayed in the list by the display, and for selecting either one of erasure by the eraser or protect from erasure setting by the protector; and
a decision switch for deciding switching for executing erasure for erasure or protect from erasure setting by the protector;
wherein the controller, while the display displays the list of reduced pictures of the plurality of image data recorded in said recording medium, and after selecting image data in which the reduced pictures are displayed by the selective switch, displays the functional selecting display picture by the functional switch, selects protection from erasure setting by the selective switching so as to control the protector so as to set protect from erasure or available for erasing by the eraser with respect to the image data selected by the decision switch; and
while the reduced pictures of the plurality of image data recorded in the recording medium which are displayed in the list, after the image data in which reduced pictures is selected by said selective switch, displays the functional selecting display screen in the display by the functional switch, and controls the eraser so as to select erasure by the selective switch for erasing the image data selected by the decision switch.

9. A recording apparatus according to claim 8, wherein the selective switch includes a crossed-button.

10. A recording apparatus according to claim 7, wherein the controller controls the protector so as to set erasure available by the eraser with respect to the image data while recording image data.

11. A recording apparatus according to claim 7, wherein the controller controls the display so as to display a remaining volume of the recording medium.

12. A recording apparatus according to claim 7, wherein: the image data is moving picture image or still picture image data, and;
the controller controls the display so as to display the list of reduced pictures of the plurality of moving picture image or still picture image recorded in the recording medium, and to display a mark for discriminating a moving picture and a still picture.

13. A recording apparatus according to claim 7, wherein the recording medium is a semiconductor memory.

14. A recording apparatus according to claim 7, wherein the recording medium is a hard disk.

15. A recording method for a recording apparatus, comprising the steps of;
inputting image data;
recording the inputted image data into a recording medium by using a file system; erasing image data recorded in the recording medium;
setting protection from erasure in the step for erasing with respect to the image data recorded in the recording medium;
displaying a list of reduced pictures of a plurality of image data recorded in the recording medium, and displaying a mark indicating protection from erasure is set with respect to the image data to which protection from erasure is set by the step for setting protection from erasure.

16. A recording method according to claim 15, wherein the step for erasing selects image data in which a desired reduced picture is displayed, while displaying the list of reduced pictures of the plurality of image data recorded in the recording medium in the step for displaying, and erases the selected image data.

17. A recording method according to claim 15, wherein the step for protection from erasure setting selects image data in which a desired reduced pictures is displayed, while displaying the list of reduced pictures of the plurality of image data recorded in the recording medium, and sets protect from erasure in the step for erasing with respect to the selected image data.

18. A recording method in a recording apparatus, comprising the steps of:
inputting image data;
recording the image data inputted into a recording medium by using a file system;
displaying a list of reduced pictures of a plurality of image data recorded in the recording medium; erasing, while displaying the list of reduced pictures of the plurality of image data recorded in the recording medium in the step for displaying, for selecting image data in which reduced pictures are displayed and to erase the selected image data; and
setting protection from erasure in the step for erasing with respect to image data recorded in the recording medium; wherein the step for displaying further includes a step for displaying a mark indicating protection from erasure setting, when protection from erasure is set in the step for protecting.

19. A recording method in a recording apparatus according to claim 18, wherein the step for protecting from erasure setting selects image data in which a desired reduced picture is displayed, while displaying the list of reduced pictures of the plurality of image data recorded in the recording medium, and sets protection from erasure.

20. A recording method in a recording apparatus comprising the steps of:
inputting image data;
recording the inputted image data into a recording medium by using a file system;
displaying a list of reduced pictures of a plurality of image data stored in the recording medium;
erasing image data stored in the recording medium; and
protecting from an erasure setting, while displaying the list of reduced pictures of the plurality of image data stored in the recording medium, for selecting image data in which desired reduced pictures are displayed, and for setting protection from erasure;

wherein the step for displaying further includes a step for displaying a mark indicating protection from erasure is set when a protection from erasure setting is set in the step for protecting.

21. A recording method according to claims 20, including:
functional switching for displaying a functional selecting display screen for selecting erasure in the step of erasing or protection from erasure setting in the step of protecting;

selective switching for selecting image data in which desired reduced pictures are displayed among the display in the list of reduced pictures of the plurality of image data recorded in the recording medium in the step for displaying and selects erasure in the step of erasing or protect from erasure setting in the step of protecting from erasure setting in the functional selection display screen; and decision switching for executing erasure in the step of erasing or protection from erasure setting in the step of protecting from erasure setting;

wherein the step of protecting from erasure setting, while displaying the list of reduced pictures of the plurality of image data recorded in the recording medium in the step for displaying, after selecting image data of reduced pictures by the selective switching, displays the functional selecting display screen by the functional switching, selects protection from erasure setting by the selective switching so as to set protection from erasure or erasure available in the step of erasing with respect to the selected image data by the decision switching; and wherein the step of erasing, while displaying the list of reduced pictures of the plurality of image data recorded in the recording medium, after selecting image data in which reduced pictures are displayed by the selective switching, displays the functional selecting display screen by the functional switching, selects erasure by the selective switching for erasing the selected image data by the decision switching.

22. A recording method according to claim 21, wherein the selective switching includes a crossed-button.

23. A recording method according to claim 20, wherein in the step for recording, erasure is set with respect to the image data by the step of erasing.

24. A recording method apparatus according to claim 20, further including a step for displaying a remaining amount of the recording medium.

25. A recording method in a recording apparatus according to claim 20, wherein the image data is moving picture image data or still picture image data, and the step for displaying further includes a step for displaying a symbol discriminating moving picture image data and still picture image data, and displaying a list of reduced pictures of a plurality of moving picture image data or still picture image data recorded in the recording medium.

26. A recording method according to claim 20, wherein the recording medium is a semiconductor memory.

27. A recording method according to claim 20, wherein the recording medium is a hard disk.

28. A recording method in a recording apparatus, including the steps of:
inputting image data;
recording moving picture image data or still picture image data inputted in the step for inputting into a recording medium of a predetermined volume by using a filing system;

displaying a remaining volume of the recording medium;
erasing the moving picture image data or still picture image data recorded in the recording medium;
protecting from erasure setting for one of setting protection from erasure or erasable in the step of erasing concerned with moving picture image data or still picture image data recorded in the recording medium;
displaying a list of reduced pictures of the plurality of moving picture image data or still picture image data recorded in the recording medium;
functional switching for displaying a functional selective display screen for selecting erasure by the step of erasing or protection from erasure setting by the step of protecting from erasure setting;
selective switching for selecting moving picture image data or still picture image data in which desired reduced pictures are displayed among the list of reduced pictures of the plurality of moving picture image data or still picture image data recorded in the recording medium in the step for displaying, and selecting erasure in the step of erasing or protection from erasure setting in the step for protecting from erasure setting; and
determining switching for executing erasure in the step for erasure or protection from erasure setting in the step for protecting from erasure setting; wherein in the step for recording, erasure is set with respect to the moving picture image data and still picture image data by the step for erasing;
wherein the step for displaying further includes a step for displaying a symbol for discriminating moving picture image data and still picture data in the list of reduced pictures of the plurality of moving picture image data and still picture image data recorded in the recording medium;
wherein the step of protecting from erasure setting, while displaying the list of reduced pictures of the plurality of moving picture image data or still picture image data recorded in the recording medium, after selecting moving picture image data or still picture image data in which reduced pictures are displayed by the selective switching, displaying the functional selective display screen by the functional switching, selecting protection from erasure setting by the selective switching, and for setting protection from erasure or erasable in the step for erasing concerned with the moving picture image data or still picture image data selected by the determining switching;
wherein the step of displaying further displays the list of reduced pictures of the plurality of moving picture image data or still picture image data recorded in the recording medium, and displays a symbol for indicating protection from erasure is set concerned with the moving picture image data or still picture image data to which erasure prohibition is set by the step of protecting from erasure setting; and
wherein the step of erasing, while displaying the list of reduced pictures of the plurality of moving picture image data or still picture image data in the step for displaying, after selecting moving picture image data or still picture image data in which reduced images are displayed in the selective switching, displaying the functional selective display screen by the functional switching, selecting erasure by the selective switching, and for erasing the moving picture image data or still picture image data selected by the determining switching.

* * * * *